INVENTOR.
Daniel T. Hindman & Robert V. Morris
BY
Christel & Bean
ATTORNEYS.

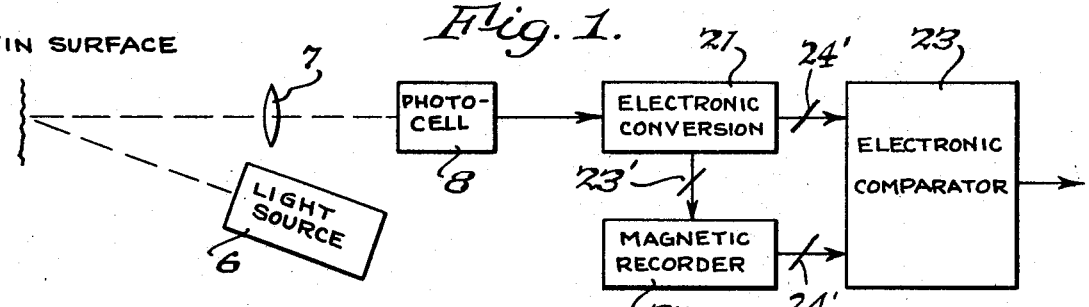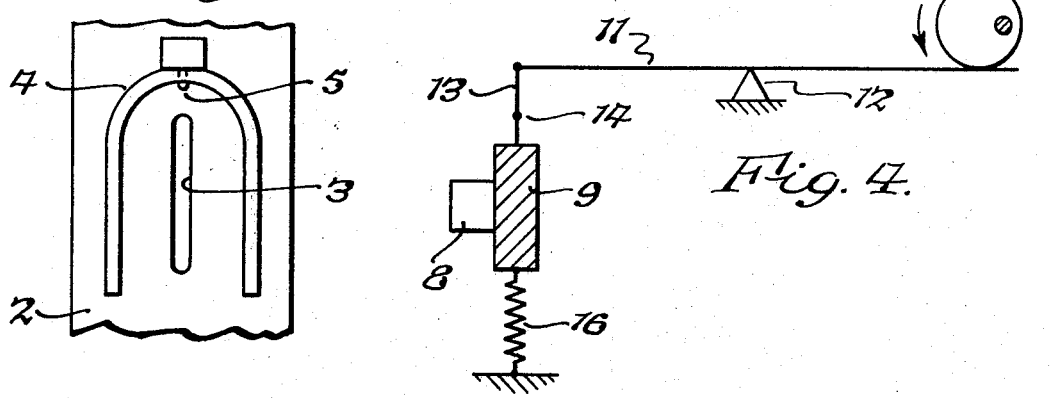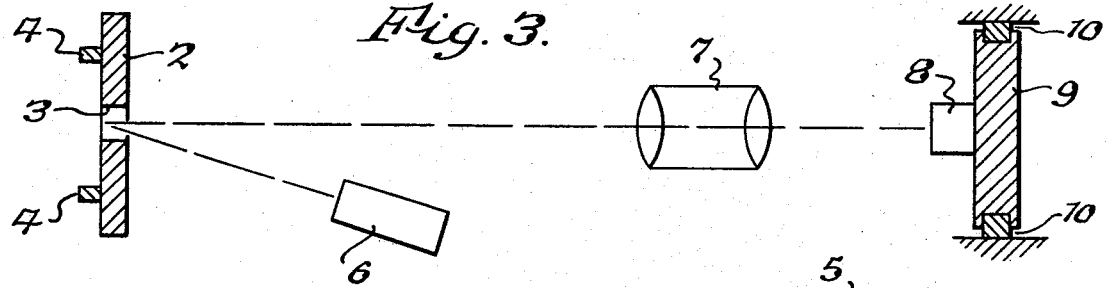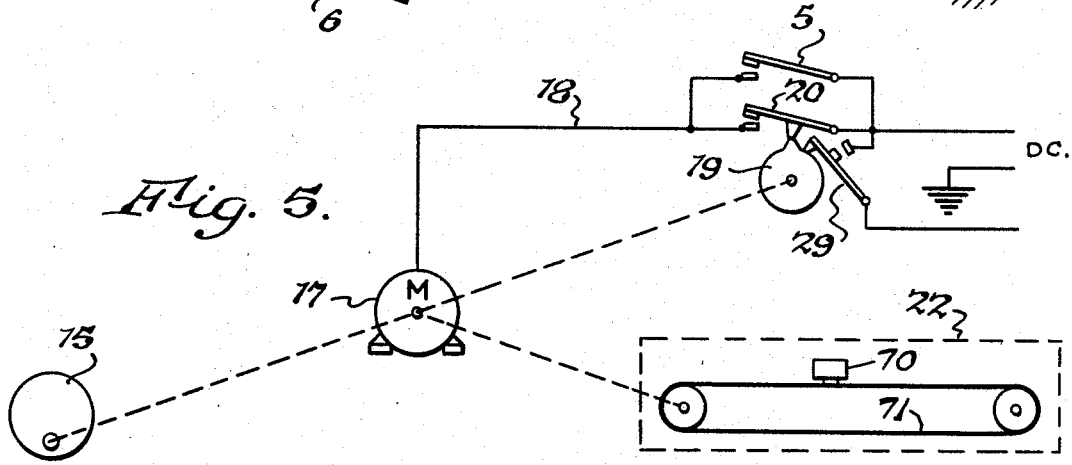

3,516,059
CONTROL SYSTEM
Daniel T. Hindman, Kenmore, and Robert V. Morris, Tonawanda, N.Y., assignors to Finger Keys, Inc., Buffalo, N.Y.
Filed Apr. 11, 1967, Ser. No. 630,019
Int. Cl. H04q *1/18;* G06k *9/08*
U.S. Cl. 340—149                                11 Claims

ABSTRACT OF THE DISCLOSURE

The skin surface presented for control purposes is optically scanned by a photocell and converted to an electric signal corresponding to the pattern of the skin surface. This signal is electronically compared to an electric signal corresponding to a reference pattern stored on a magnetic record. If there is sufficient identity between the two signals the desired control is accomplished. The photocell scanning and signal converting unit can be used to magnetically record the reference pattern.

BACKGROUND OF THE INVENTION

This invention relates generally to the control art, and more specifically to the control of a member in response to a skin surface having a pre-selected pattern.

U.S. Letters Patent No. 3,201,961 granted Aug. 24, 1965 to Holland V. Williams and Daniel T. Hindman (one of the inventors herein) discloses a control device which avoids the need for a key or other separate manipulating device and provides operation automatically upon presentation of a skin surface, such as on a finger, having a preselected distinguishing pattern. Such a device offers many advantages over conventional key-operated locks, as set forth therein.

While not limited thereto, the aforesaid patent specifically discloses, by way of example, a dual photocell scanning utit wherein one photocell optically scans the actual skin surface presented for comparison, and the other photocell simultaneously optically scans a reference print of the preselected pattern. Individual signal generating circuits are associated with the respective photocells, and the respective signals are compared. If there is sufficient identity therebetween the control member is actuated to accomplish the intended purpose.

SUMMARY OF THE INVENTION

The primary object of this invention is to provide a control system embodying the patented concept with but a single photocell scanning system.

This is accomplished by magnetically recording the reference print pattern. The actual skin surface presented for control purposes is optically scanned and converted to an electrical signal as before. However, in accordance with the instant invention, this "actual" signal is compared with the electromagnetically recorded reference signal. The photocell scanner used to scan the actual skin surface also is used to record that surface pattern on a magnetic record in the first instance, to comprise the reference pattern. In this way, scanning of an actual finger tip or other skin surface and comparison with a reference print pattern is provided, as before, but with only a single photocell optical scanning system.

This arrangement has the advantage that a relatively simple, inexpensive and fool-proof magnetic tape recording device, having excellent signal repeatability, can be substituted for the more expensive and complex optical scanning system, thereby increasing the dependability of the system while reducing the cost and simplifying its construction. Also, since the same optical scanning system is used to prepare the magnetic record, greater identity in reproduction is provided and the need for a fingerprint is avoided.

The foregoing and other objects, advantages and characterizing features of the instant invention will become readily apparent from the ensuing detailed description of an illustrative embodiment, reference being made to the accompanying drawings depicting the same.

BRIEF DESCRIPTION OF THE DRAWINGS

FIG. 1 is a schematic representation of a control system of this invention;

FIG. 2 is a fragmentary elevational view of a test station, with its finger receiving guide member and actuating switch;

FIG. 3 is a diagrammatic, horizontal sectional representation of an optical scanning arrangement useable with this invention;

FIG. 4 is a diagrammatic, vertical sectional representation of a photocell scanning mechanism;

FIG. 5 is a schematic illustration of the drive motor and associated control components;

DESCRIPTION OF THE ILLUSTRATED EMBODIMENT

Figure 6:
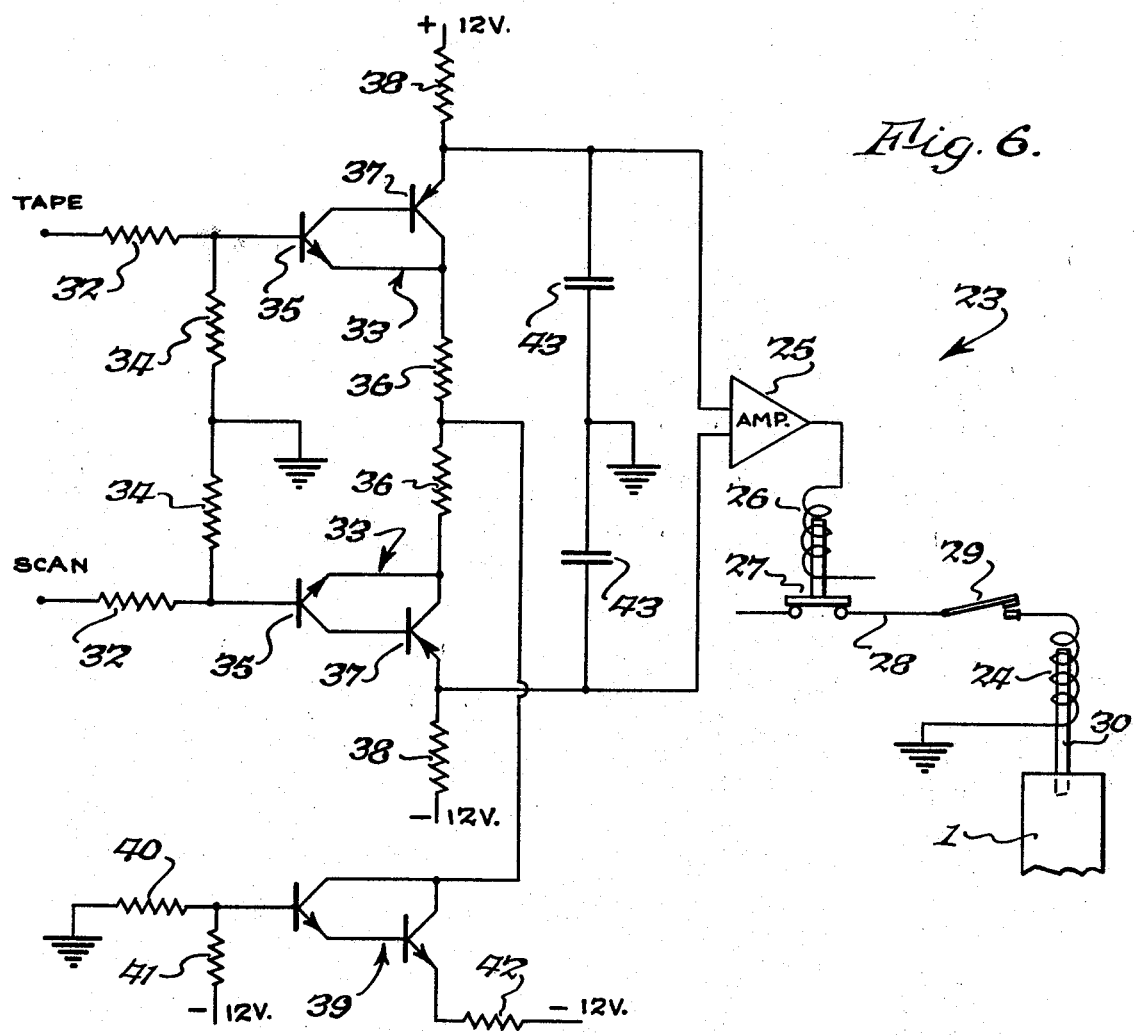
FIG. 6 is a diagrammatic illustration of the comparator circuit.

Referring now to the accompanying drawings, there is shown a control system constructed in accordance with our invention, adapted to control the operation of a door 1 (FIG. 6) in response to a pre-selected finger skin surface pattern. To this end, there is provided a test station, which can be located adjacent door 1, comprising a member 2 having an elongated aperture 3, therethrough. A finger guide 4 is provided adjacent aperture 3 for guiding the finger into position thereagainst. A control switch 5 is arranged to be engaged and actuated by the finger tip when the latter is inserted in guide 4 for presentation at aperture 3.

A suitable light source 6 is arranged behind member 2 to obliquely illuminate the skin surface presented at aperture 3, and an objective lens assembly 7 focuses the reflected skin surface pattern onto photocell 8 carried by a slide member 9 mounted on guides 10 for vertically reciprocating movement. Photocell 8 is selected to admit only a point of light, and thereby "see" only a corresponding portion of the reflected skin surface pattern. Therefore, upon moving member 9 upwardly, the entire skin surface pattern is scanned by photocell 8.

Such movement of photocell 8 can be accomplished by any suitable means. In the illustrated embodiment, a lever 11 is pivoted on a fulcrum 12 and pivotally connected at one end to a link 13 which in turn is pivotally connected at 14 to slide member 9. The opposite end of lever 11 bears against a cam 15, and is caused to follow the cam by the action of a return spring 16. Cam 15 is driven by a motor 17 having an energizing circuit controlled by switch 5 and including lead 18 and a suitable D.C. source. Rotation of cam 15 pivots lever 11 clockwise as viewed in the drawing, raising member 9 against the tension of spring 16. The member 9 is returned by spring 16 as the cam surface retreats.

Motor 17 also drives a rotary cam 19 having a lobe adapted to open a switch 20 upon completion of a single scan. Switch 20 is arranged in controlling relation to the motor energizing circuit, in by-pass relation to master switch 5. Thus, upon closing switch 5, motor 17 is energized and rotates cams 15 and 19. Upon rotating cam 19 out of the position shown in FIG. 5, switch 20 closes, being opened again by cam 19 at the end of each complete scanning movement. If the finger is still in place, switch 5 remains closed and repeated scanning occurs. Switch 20 completes a holding circuit ensuring the completion of each scanning movement.

It is a particular feature of this invention that only one optical scanning arrangement is required, with the optically scanned skin surface being compared to a reference pattern stored on a magnetic record such as tape or wire. To this end, the output of photocell 8 is converted by an appropriate electronic circuit, generally designated 21, into a series of electrical pulses. Initially, to provide a reference print these pulses are transmitted to a magnetic tape recorder, generally designated 22, where they are recorded and stored on magnetic tape to provide a reference pattern of pulses taken from the skin surface selected for this purpose. Thereafter, the recording circuit is broken, by appropriate switching indicated at 23′. Then, upon subsequent scanning of a skin surface, in the same manner as before, the output signal of circuit 21 is transmitted to a comparator circuit generally designated 23 where it is compared with the output signal of tape recorder 22, appropriate switches being provided, as indicated at 24′, to interrupt the output connections from circuit 21 and recorder 22 to comparator 23, when recording.

If the two signals are sufficiently identical, they balance one another. However, if the two signals are not sufficiently identical, there is produced a differential signal which is transmitted to a signal amplifier 25 (FIG. 6) arranged in the energizing circuit of a relay 26. Energization of relay 26 opens a normally closed switch 27 in the energizing circuit 28 of a door control relay 24. Normally open switch 29 is arranged in this energizing circuit, being closed by cam 19 just prior to the end of each scanning movement. In this way, if the respective patterns have sufficient identity, switch 27 remains closed and closing of switch 29 completes an energizing circuit to relay 24, retracting its armature 30 which comprises a control latch for door 1. If, however, there has been insufficient identity between the patterns, producing a differential signal, relay 26 will have been energized to open switch 27 and thereby disable the energizing circuit to relay 24 prior to closing of switch 29.

Figure 7:
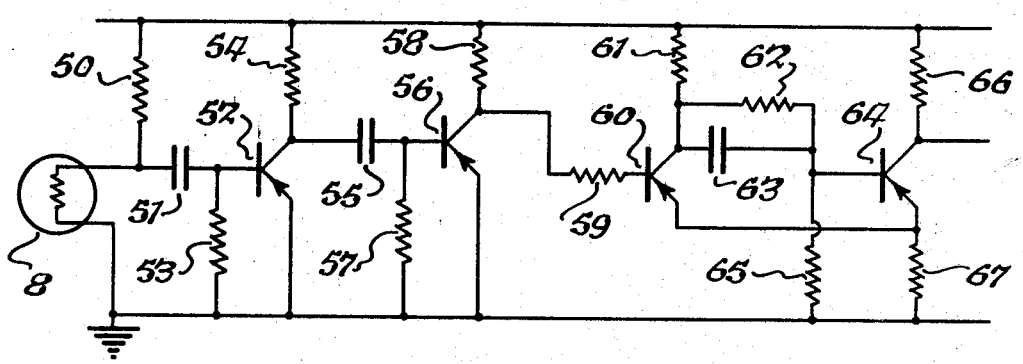
FIG. 7 is a diagrammatic illustration of the electronic conversion circuit.

A suitable electronic conversion circuit 21 is shown in FIG. 7. Photocell 8 is connected between a load resistor 50 and ground, across a suitable power supply. Variations in the pattern of light caused by the passage of alternating light and dark areas as the skin surface is scanned by the photocell, generate current pulses which pass to the amplifier input through a coupling condenser 51. The first amplifier stage comprising transistor 52, bias resistance 53, and load resistance 54, amplifies these pulses which then pass to a second amplifier stage through coupling condenser 55. The second stage, consisting of transistor 56, bias resistance 57 and load resistance 58, further amplifies the signal pulses, and inverts them by changing their polarity.

The amplifier stages are connected to a leveler circuit, through coupling resistance 59. The leveler is a conventional Schmitt trigger circuit, having a transistor 60, load resistance 61 and resistance-capacitance coupling network 62, 63. The output of transistor 60 passes to the amplifier section comprising transistor 64 having a bias resistance 65 and load resistance 66. A common emitter resistance 67 is provided.

The result is the production of a pulse of maximum amplitude, regardless of the input amplitude, so long as the input signal pulse is of sufficient strength or amplitude to turn on transistor 60. Variations in the amplitude of the input pulses, such as will naturally occur, are thereby accommodated, and the level, uniform output pulses of maximum amplitude are transmitted to the first gate transistor 68 through a coupling resistance 69.

A suitable comparison circuit is illustrated in FIG. 6, comprising basically a differential transformer wherein the output from the tape recorder is balanced against or compared with the output from the optical scanning unit with the result that there is no net output signal unless the two inputs are out of balance. To this end, each input circuit includes a current limiting resistance 32 leading to a Darlington pair of transistors 33. A bias resistance 34 is provided for the input transistor 35 of the Darlington pair and a collector load resistance 36 is connected to the second transistor 37. An emitter resistance 38 also is provided for transistor 37. A constant current regulator is provided, in the form of another Darlington pair of transistors generally designated 39, having a bias resistance 40, a current limiting resistance 41, and an emitter resistance 42. Since these circuits are well-known to those skilled in the art, further description of their function and operation is believed to be unnecessary. Condensers 43 filter out high frequencies, leaving only the low frequency print pattern pulses to be compared, and the output leads from the respective sides of the differential amplifier are connected to amplifier 25 in an arrangement providing no output signal when the two input signals to the differential amplifier are balanced (i.e., substantially identical). Obviously, the various components of the differential amplifier circuit will be selected to provide the extent or degree of identity required to provide no output signal. In other words, it is contemplated that absolute identity will not be required, and that substantial correspondence will suffice for the purposes to which the instant invention will be put.

Tape recorder 22 can be any suitable recorder of conventional design. It can have a head 70 which both records on the tape 71 and "reads" the recorded signal. The tape will have a constant speed drive from motor 17, synchronized with cam 15 for simultaneous scanning of the actual skin surface and the recorded image or pattern. While the tape drive could have a spring return, an endless tape is shown herein. Upon opening of both switches 5 and 20, both tape 71 and photocell 8 will be positioned to start a subsequent scan. Recorder 22 also will include the usual signal converting and amplifying circuit, to provide an output signal of the same type as converter 21. Instead of the usual speaker, the output from the tape recorder amplifier is transmitted to comparator 23.

Accordingly, it is seen that our invention fully accomplishes its intended objects. A person desiring to actuate the control simply places the proper finger in guide 4. Master switch 5 is closed thereby, and the actual skin surface is directly scanned by photocell 8. The reference pattern on tape 71 is simultaneously scanned by tape recorder head 70. The respective signals are compared, and if they substantially correspond the latch 30 will be retracted when switch 29 is closed just prior to the end of the scan. If they do not have the requisite degree of identity, switch 27 is opened prior to the momentary closing of switch 29. Each scan will be completed, even if the finger is removed during the scan, and repeated scanning will occur automatically as long as the finger is in place over the viewing aperture.

The foregoing detailed disclosure is illustrative only, and it is intended that the scope of our invention be limited only as defined by the appended claims. The control system of this invention obviously is not limited to use with doors, or with the skin pattern of a finger surface. The various system components can be located adjacent the test station or the control member, for example in a wall adjacent the door, or can be remotely located.

Having described and disclosed our invention what we claim as new is:

1. A control system comprising a control member, and means for operating said control member automatically in response to presentation of a preselected skin pattern, said operating means including means for reading a skin surface pattern and comparing it to a magnetically recorded reference pattern, and means responsive to a predetermined degree of correspondence between said patterns for actuating said operating means.

2. A control system as set forth in claim 1, wherein said reading means comprise means for scanning a skin surface presented by a person desiring to operate said control member and generating a first signal corresponding to the pattern thereof, together with means for scanning the magnetically recorded reference pattern and generating a second signal of the same type as said first signal but corresponding to said reference pattern.

3. A control system as set forth in claim 2, together with means for illuminating the skin surface presented for scanning.

4. A control system as set forth in claim 3, wherein said reading means comprise photoelectric means.

5. A control system as set forth in claim 2, together with means for recording said first signal to comprise a reference pattern.

6. A control system as set forth in claim 2, wherein said scanning means simultaneously scan the skin surface pattern and the magnetically recorded reference pattern.

7. A control system as set forth in claim 6, together with means synchronizing said scanning means, and means automatically operable to cause repeated scanning upon such presentation of a skin surface.

8. A control system comprising means responsive to a skin surface for generating a first signal corresponding to the pattern thereof, means for scanning a magnetically recorded reference pattern and generating a second signal corresponding thereto, means for comparing said first and second signals, and operating means responsive only to substantial correspondence between said signals.

9. In a control system of the class described, means for reading a skin surface pattern presented in one medium and converting it to a first signal pattern in a second medium, means for reading a reference pattern stored in a third medium and converting it to a second signal pattern in said second medium, means for comparing said first and second signal patterns, and operating means responsive to a predetermined degree of correspondence between said signal patterns.

10. A control system as set forth in claim 9, wherein said first medium comprises the actual skin surface, said second medium comprises an electrical signal, and said third medium comprises a magnetic record.

11. A control system as set forth in claim 9, together with means selectively operable to convert said first signal pattern from said second medium to said third medium to comprise said reference print.

References Cited

UNITED STATES PATENTS 3,201,961  8/1965  Williams et al. _____ 70—277
3,202,761  8/1965  Bibbero _____ 340—146.3

THOMAS A. ROBINSON, Primary Examiner

U.S. Cl. X.R.

70—277; 340—146.3